US012304092B2

(12) United States Patent
Hangartner

(10) Patent No.: US 12,304,092 B2
(45) Date of Patent: May 20, 2025

(54) FOLDING KNIFE SAFETY MECHANISM

(71) Applicant: Milwaukee Electric Tool Corporation, Brookfield, WI (US)

(72) Inventor: Scott M. Hangartner, Hartland, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 218 days.

(21) Appl. No.: 17/711,454

(22) Filed: Apr. 1, 2022

(65) Prior Publication Data

US 2022/0219341 A1 Jul. 14, 2022

Related U.S. Application Data

(63) Continuation of application No. 16/814,642, filed on Mar. 10, 2020, now Pat. No. 11,298,837.

(60) Provisional application No. 62/816,748, filed on Mar. 11, 2019.

(51) Int. Cl.
*B26B 1/04* (2006.01)
*B26B 1/06* (2006.01)

(52) U.S. Cl.
CPC ................ *B26B 1/048* (2013.01); *B26B 1/06* (2013.01)

(58) Field of Classification Search
CPC .. B26B 1/00–02; B26B 1/04–046; B26B 1/06
See application file for complete search history.

(56) References Cited

U.S. PATENT DOCUMENTS

| | | | | |
|---|---|---|---|---|
| 4,170,061 | A | 10/1979 | Henry et al. | |
| 4,541,175 | A | 9/1985 | Boyd et al. | |
| 4,551,917 | A | 11/1985 | Walker | |
| 5,495,674 | A | 3/1996 | Taylor, Jr. | |
| 5,737,841 | A * | 4/1998 | McHenry | B26B 1/048 30/160 |
| 6,122,829 | A | 9/2000 | McHenry et al. | |
| 6,338,431 | B1 | 1/2002 | Onion | |
| 6,378,214 | B1 | 4/2002 | Onion | |
| 6,438,848 | B1 | 8/2002 | McHenry et al. | |
| D474,669 | S | 5/2003 | Onion | |
| 6,591,504 | B2 | 7/2003 | Onion | |
| 7,124,510 | B2 | 10/2006 | Frazer | |
| 7,340,836 | B2 * | 3/2008 | Whitemiller | B26B 11/00 30/162 |
| 7,340,838 | B2 | 3/2008 | Onion | |
| RE41,259 | E | 4/2010 | McHenry et al. | |
| RE42,906 | E | 11/2011 | Onion | |
| 8,745,878 | B2 * | 6/2014 | Glesser | B26B 1/048 30/155 |
| 8,832,943 | B2 | 9/2014 | Sakai | |

(Continued)

FOREIGN PATENT DOCUMENTS

| | | |
|---|---|---|
| CN | 205552581 | 9/2016 |
| WO | WO 99/52687 | 10/1999 |

*Primary Examiner* — Jason Daniel Prone
*Assistant Examiner* — Richard D Crosby, Jr.
(74) *Attorney, Agent, or Firm* — Reinhart Boerner Van Deuren s.c.

(57) ABSTRACT

A folding knife with a locking mechanism is provided. The folding knife includes a locking spring that interfaces with a recess in the blade to bias the blade from being pivoted out of the handle. A button interfaces with the locking spring to actuate the locking spring interfacing with the blade.

20 Claims, 8 Drawing Sheets

(56) References Cited

U.S. PATENT DOCUMENTS

| | | | | |
|---|---|---|---|---|
| 8,978,253 | B2 * | 3/2015 | Snyder | B26B 1/02 30/155 |
| 9,061,426 | B2 | 6/2015 | Harvey | |
| 9,352,473 | B2 | 5/2016 | Harvey | |
| 9,592,612 | B2 * | 3/2017 | Koenig | B26B 1/06 |
| 9,808,940 | B1 * | 11/2017 | Sakai | B26B 1/042 |
| 9,833,912 | B2 | 12/2017 | Ikoma | |
| 9,908,245 | B1 * | 3/2018 | Tkachenko | B26B 1/044 |
| 10,150,221 | B1 * | 12/2018 | Chen | B26B 1/046 |
| 10,899,024 | B2 * | 1/2021 | Duey | B26B 1/048 |
| 2004/0020058 | A1 | 2/2004 | Vallotton | |
| 2004/0158991 | A1 | 8/2004 | Freeman | |
| 2004/0255389 | A1 | 12/2004 | Seber et al. | |
| 2012/0017443 | A1 * | 1/2012 | Hao | B26B 1/02 30/161 |
| 2013/0263455 | A1 * | 10/2013 | Collins | B26B 1/044 29/896.9 |
| 2014/0115899 | A1 * | 5/2014 | Frazer | B26B 1/042 30/160 |
| 2015/0266188 | A1 * | 9/2015 | Demko | B26B 1/042 30/159 |
| 2015/0352731 | A1 * | 12/2015 | France | B26B 1/048 30/159 |
| 2016/0121493 | A1 | 5/2016 | Ikoma | |
| 2018/0036893 | A1 | 2/2018 | Ikoma | |
| 2020/0047358 | A1 | 2/2020 | Ikoma | |
| 2020/0230830 | A1 * | 7/2020 | Demko | B26B 1/048 |

* cited by examiner

FOLDING KNIFE SAFETY MECHANISM

CROSS-REFERENCE TO RELATED PATENT APPLICATIONS

This application is a continuation of U.S. application Ser. No. 16/814,642 filed Mar. 10, 2020, which claims priority to U.S. Provisional Application No. 62/816,748 filed Mar. 11, 2019, each of which is titled "Folding Knife Safety Mechanism" and each of which is incorporated herein by reference in its entirety.

BACKGROUND OF THE INVENTION

The present invention relates generally to the field of knives. The present invention relates specifically to a knife, such as a folding knife, that includes a sliding lock to restrain the blade within the handle.

SUMMARY OF THE INVENTION

According to one embodiment, a folding knife includes a handle, an internal cavity defined by the handle, a blade rotatably coupled to the handle, a sliding lock slidably coupled to the handle, and a locking spring. The blade rotates with respect to the handle into and out of the internal cavity between a retracted position and an extended position. The locking spring is coupled to the handle. A first end of the locking spring interfaces with a recess defined by the blade, such as a notch, when the blade is in the retracted position. The locking spring interfaces against the sliding lock and biases the sliding lock away from a tip of the blade when the blade is in the retracted position.

According to another embodiment, a folding knife includes a handle including a top and a bottom opposite the top, an internal cavity defined by the handle, a blade rotatably coupled to the handle, a locking spring coupled to the handle, and a sliding lock slidably coupled to the handle. The blade rotates with respect to the handle into and out of the internal cavity between a retracted position and an extended position out of the bottom of the handle. The blade defines a recess, such as at a tang of the blade opposite the tip of the blade. The locking spring includes a middle portion that protrudes towards the bottom of the handle. A first end of the locking spring is within the recess when the blade is in the retracted position. The sliding lock interfaces against the middle portion of the locking spring.

According to another embodiment, a folding knife includes a handle, an internal cavity defined by the handle, a blade rotatably coupled to the handle, a locking spring coupled to the handle, and a sliding locking slidably coupled to the handle. The blade rotates with respect to the handle into and out of the internal cavity between a retracted position and an extended position. The blade defines a recess, such as at a tang of the blade opposite the tip of the blade. The locking spring defines a first end and a second end. The first end of the locking spring is within the recess of the blade when the blade is in the retracted position, and the second end of the locking spring defines a V-shape.

According to one embodiment, a folding knife includes a handle and a blade pivotably coupled to the handle via a pivot screw. The handle has an internal cavity with an opening that the blade pivots into and out of the internal cavity. The tang of the blade is coupled to the pivot screw to pivot between a retracted position, an extended position, and a range of intermediate positions. The folding knife includes a locking spring and a sliding lock to restrict opening of the blade from the retracted position. One end of the locking spring is rigidly coupled to the knife handle, and the other end of the locking spring includes an extension that interfaces against the tang of the blade. The tang of the blade has a notch that the locking spring extension is within when the blade is in the closed and locked position. The notch includes a locking wall that interfaces against the locking spring extension when a user attempts to rotate the blade out of the retracted position. In one embodiment the locking wall of the notch is collinear with a radial line extending from a center of the pivot screw.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a knife and elements thereof are shown. Various embodiments of a knife discussed herein relate to a folding knife and a mechanism for securing the blade within the handle. The knife includes a sliding lock that locks a folding knife in the closed position via a unique interface between the sliding lock and the blade. The interface between the sliding lock and the blade minimizes the chances of the blade being opened accidentally while still permitting the blade to be removed from the handle when a user performs a deliberate series of steps to disengage the sliding lock with the blade. This helps prevent injuries occurring because the blade was unexpectedly exposed.

Figure 1:
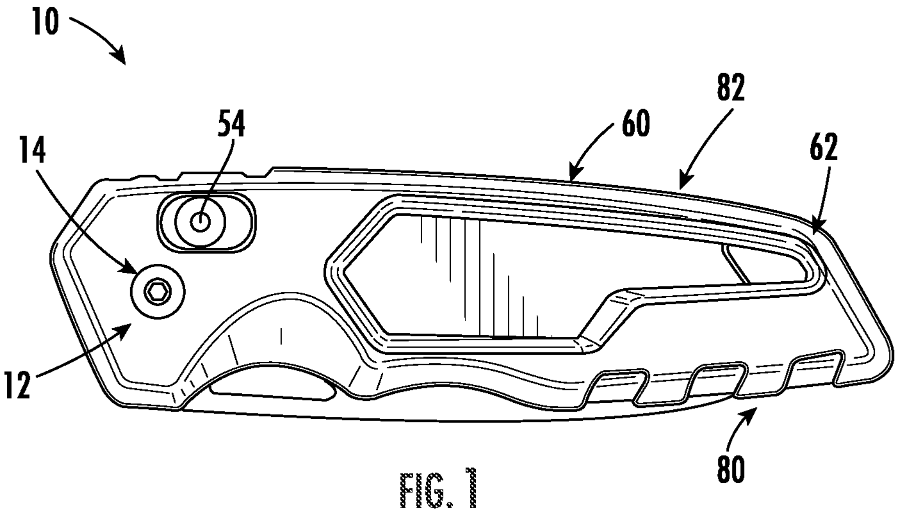
FIGS. 1-3 are several side views of a knife, according to an embodiment.
Figure 2:
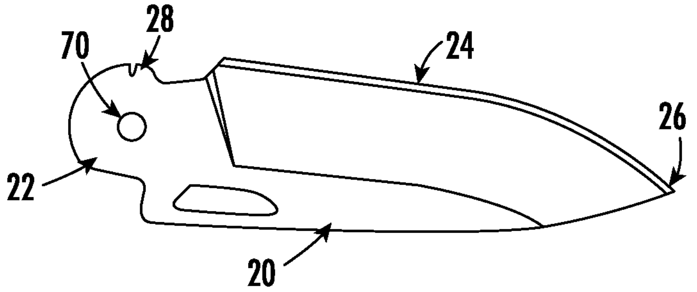
Figure 3:
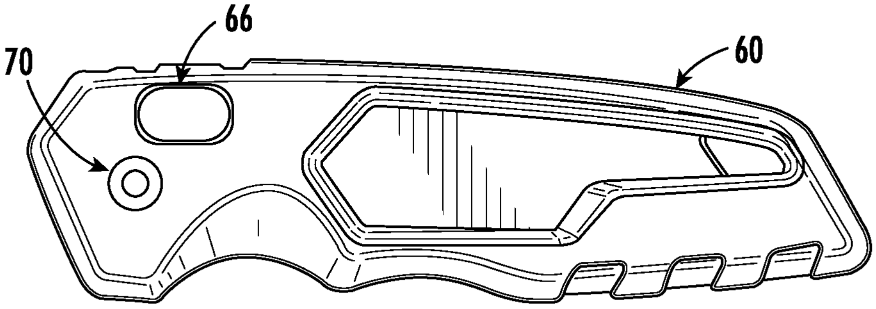
Figure 4:
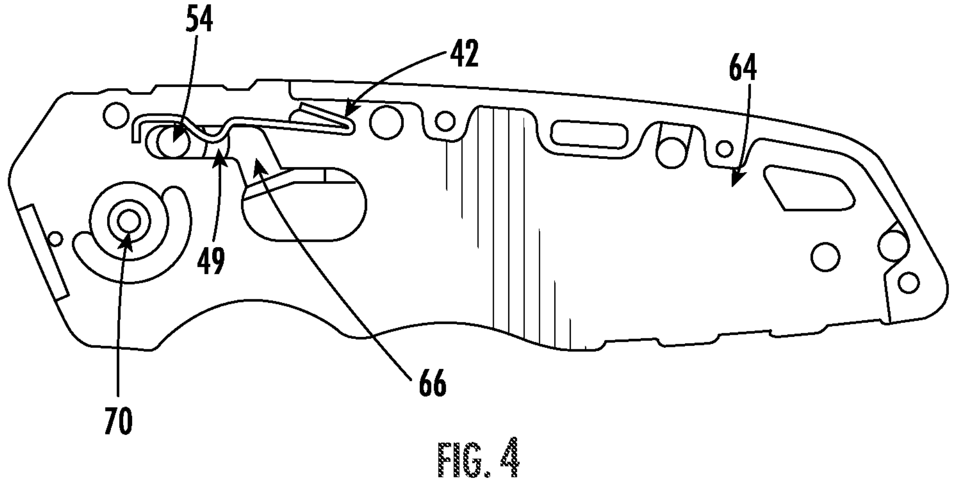
FIGS. 4-5 are several cross-section views of the knife of FIG. 1.
Figure 5:
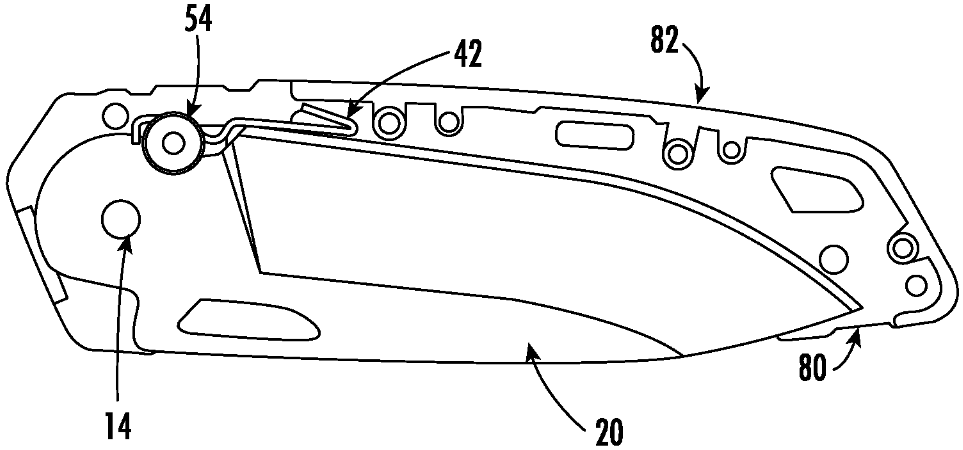
Figure 6:
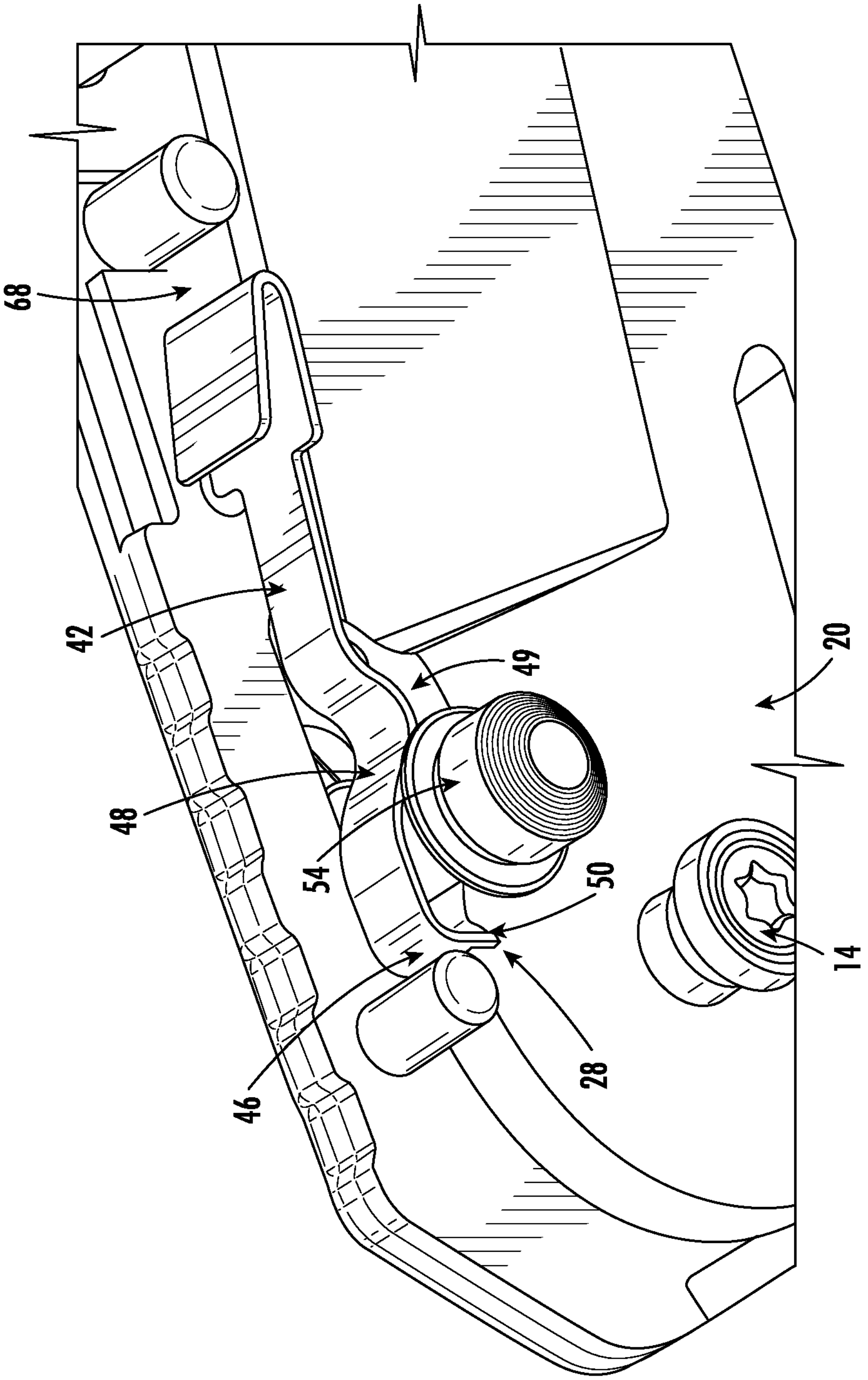
FIG. 6 is a detailed perspective view of the knife of FIG. 1.

Referring to FIGS. 1-3, a knife, such as a folding knife 10, is shown according to an exemplary embodiment. In general, folding knife 10 comprises blade 20 and handle 60. Blade 20 is rotatably coupled to handle 60 such that blade 20 rotates around longitudinal axis 12 centered on pivot screw 14 with respect to handle 60. Pivot screw 14 passes through pivot screw hole 70.

In one embodiment, handle 60 defines internal cavity 68 within which blade 20 is retracted. In a specific embodiment handle 60 comprises first side shell 62 and second side shell 64. Blade 20 rotates with respect to handle 60 into and out of internal cavity 68 between a retracted position and an extended position. Handle 60 defines a bottom 80 and a top 82 opposite the bottom 80, and blade 20 rotates out of bottom 80 of handle 60. When knife 10 is in the retracted position, blade 20 is closed within internal cavity 68 so that cutting edge 24 and tip 26 are safely secured. Sliding lock 54 is slidably coupled to handle 60. Sliding lock 54 secures blade 20 within internal cavity 68 when blade 20 is in the closed and locked position.

Referring to FIGS. 4-7, locking spring 42 interfaces with tang 22 of blade 20 to lock blade 20 in the closed position. Tang 22 of blade 20 is opposite tip 26 of blade 20. Sliding lock 54 interfaces against locking spring 42 to selectively disengage locking spring 42 from notch 28, which frees blade 20 to pivot into the open position (e.g., where edge 24 and tip 26 are rotated from handle 60). Stated another way, locking spring 42 interfaces against the sliding lock 54 and biases the sliding lock 54 away from tip 26 of blade 20 when blade 20 is in the retracted position.

In a specific embodiment, sliding lock 54 interfaces against middle portion 49 of locking spring 42. Middle portion 49 protrudes away from top 82 of handle 60 towards bottom 80 of handle 60.

Figure 7:
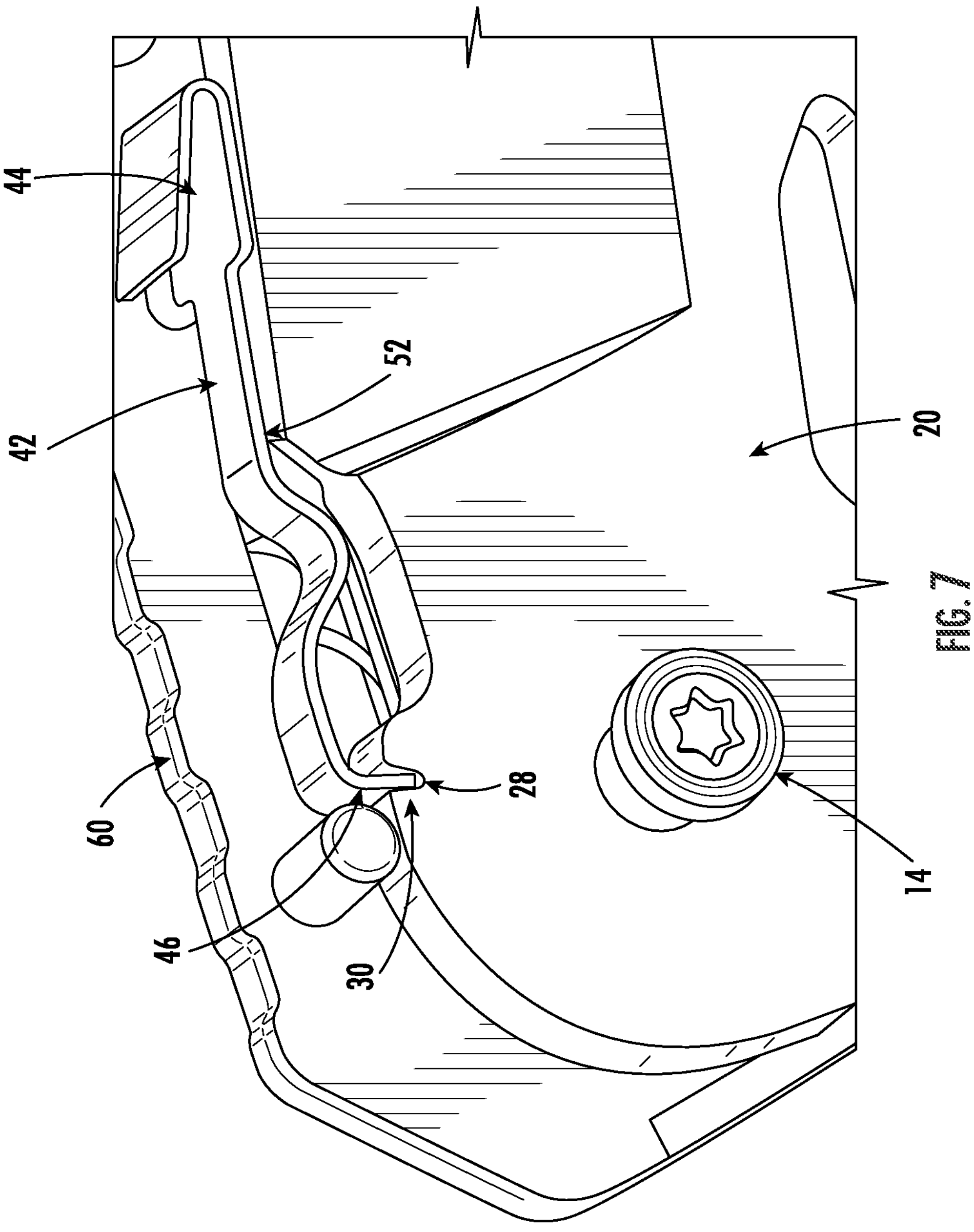
FIG. 7 is a detailed perspective view of the knife of FIG. 1.
Figure 8:
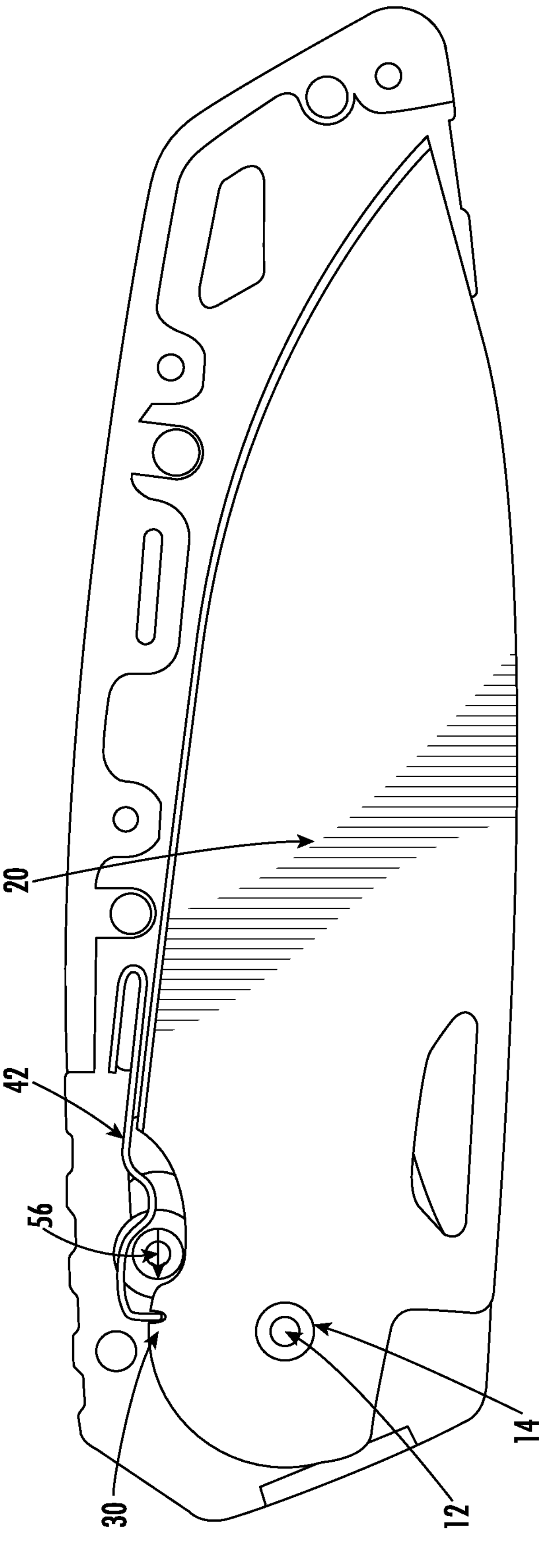
FIGS. 8-11 are several cross-section views of the knife of FIG. 1 transitioning from a closed position to an opened position.

Fixed end 44 of locking spring 42, shown in FIG. 7 as comprising a V-shape, is rigidly coupled to handle 60. In one embodiment, locking spring 42 is fixedly coupled to one of first side shell 62 and second side shell 64 of handle 60. In another embodiment, locking spring 42 is fixedly coupled to both first side shell 62 and second side shell 64. Free end 46 of locking spring 42 is biased to engage within notch 28 and interface with notch 28 when blade 20 is in the retracted position (shown in FIGS. 6-7), thus biasing blade 20 towards the retracted position. Free end 46 of locking spring 42 pivots with respect to fixed end 44. In a specific embodiment notch 28 is at tang 22 of blade 20, and thus free end 46 of locking spring 42 interfaces against tang 22 of blade 20.

Turning to FIGS. 8-11, illustrated therein are a series of steps to transition folding knife 10 from a locked and retracted position to an unlocked and extended position. Starting at FIG. 8, blade 20 is in the closed position within handle 60. Free end 46 of locking spring 42 biases towards pivot screw 14, and as a result locking extension 50 of locking spring 42 interfaces with a recess within blade 20, shown as notch 28, when blade 20 is in the retracted position. Sliding lock 54 is biased away (to the left in FIG. 8) from displacement wall surface 48 in direction 56 away from tip 26 of blade 20. If a user were to attempt to rotate blade 20 clockwise from the perspective of FIG. 8, locking wall surface 30 of notch 28 would interface against free end 46 of locking spring 42 to exert an increasing biasing force against blade 20 rotating clockwise out of handle 60. In at least one embodiment locking wall surface 30 of notch 28 is radially aligned with respect to longitudinal axis 12 at the center of pivot screw 14.

Figure 9:
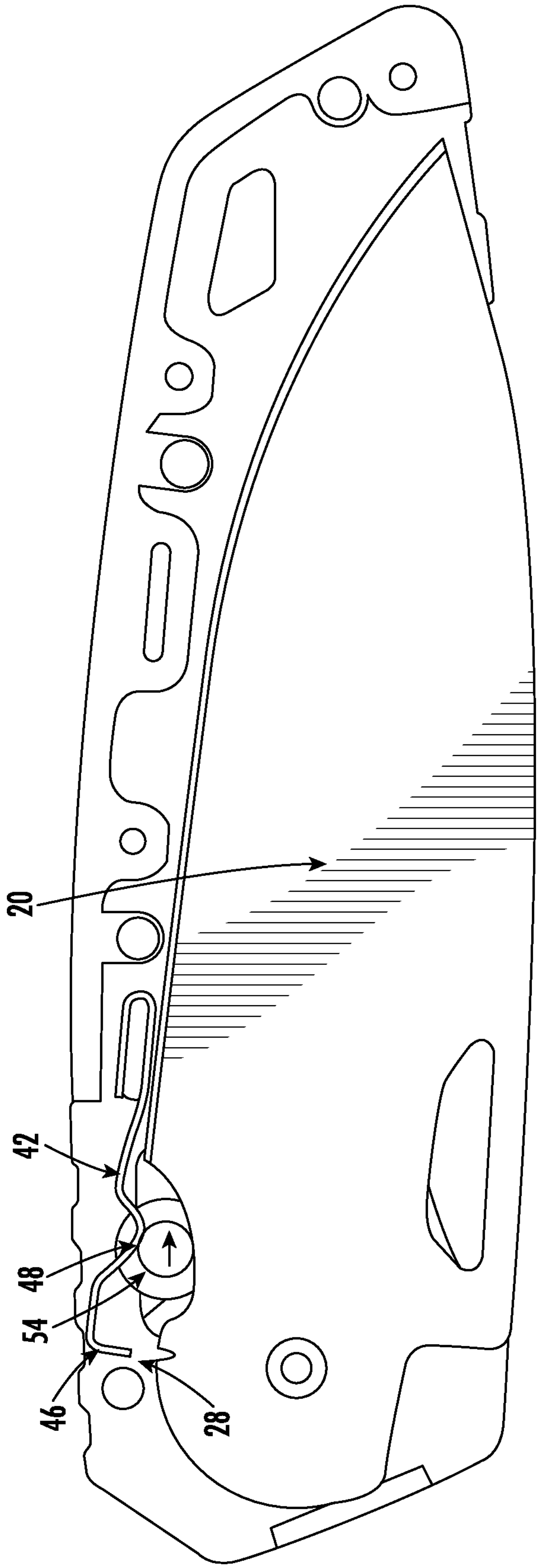

Turning to FIG. 9, a user forces sliding lock 54 along sliding lock aperture 66 towards and against displacement wall surface 48. Displacement wall surface 48 is angled with respect to sliding lock aperture 66 so that the interface between sliding lock 54 and displacement wall surface 48 forces free end 46 of locking spring 42 to pivot away from pivot screw 14 and disengage from notch 28. The amount of force necessary to displace free end 46 from notch 28 is a function of several aspects, including the angle of displacement wall surface 48 with respect to sliding lock aperture 66 and the thickness 52 of locking spring 42 (e.g., its resistance to being deformed). To reduce the force necessary to unlock sliding lock 54, the thickness 52 of locking spring 42 may be decreased and/or the angle between displacement wall surface 48 and sliding lock aperture 66 can be reduced (e.g., displacement wall surface 48 may be adjusted further from perpendicular and closer to collinear with respect to sliding lock aperture 66).

Figure 10:
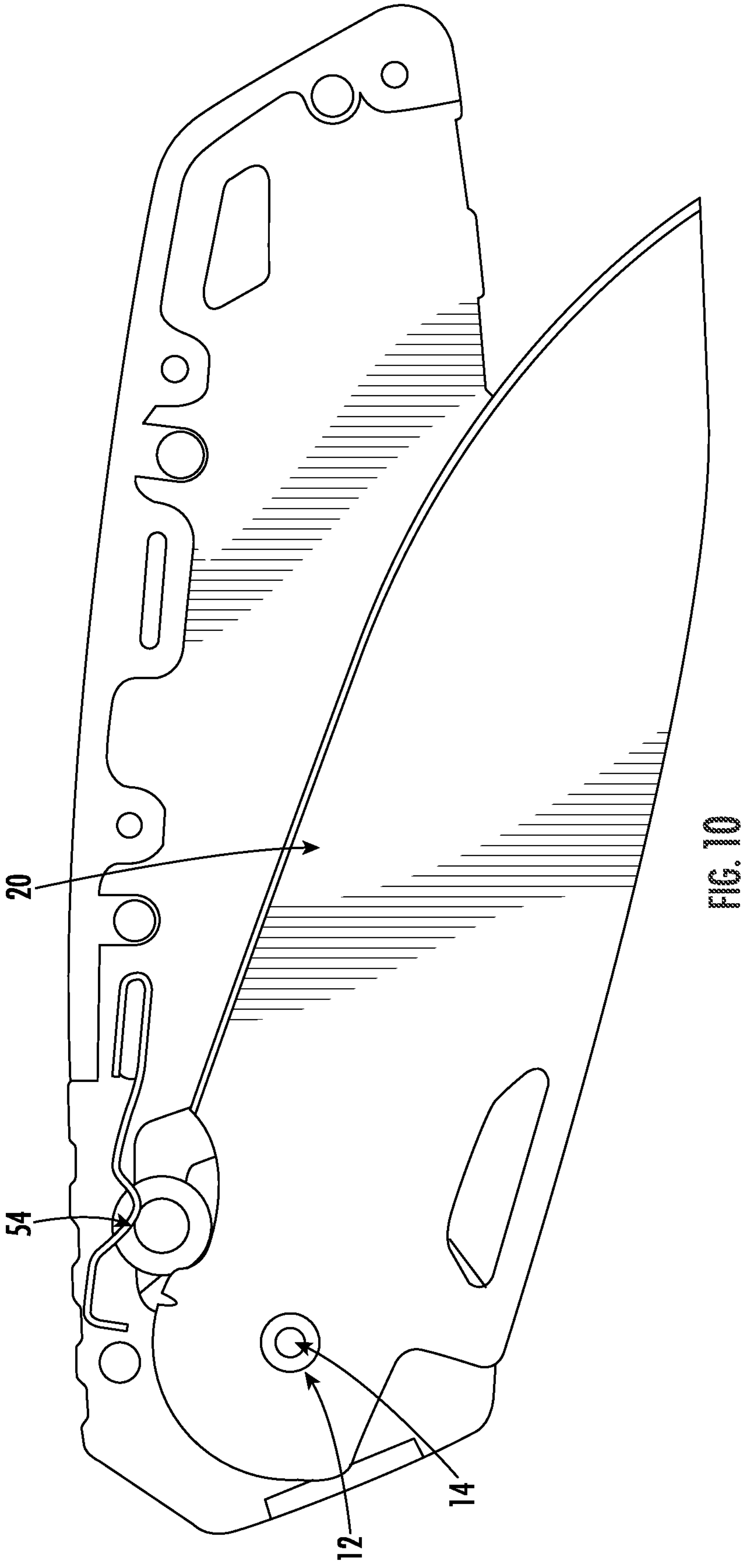

Turning to FIG. 10, after free end 46 is disengaged from notch 28, blade 20 is rotated clockwise from the perspective of FIG. 10. As a result, cutting edge 24 and tip 26 of blade 20 are exposed outside of handle 60. In a specific embodiment free end 46 of locking spring 42 does not interface with blade 20 when blade 20 is in the extended position.

Figure 11:
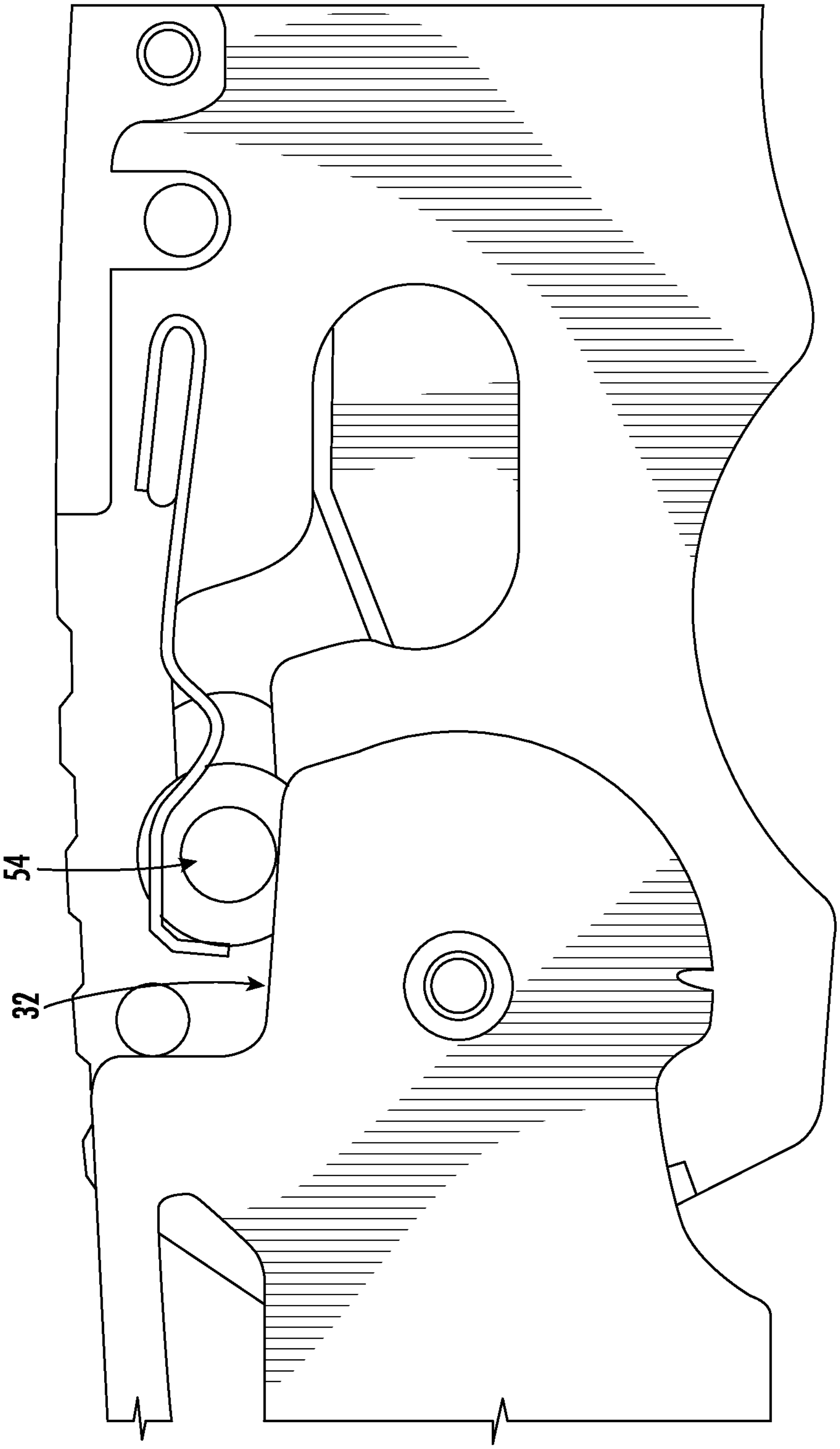

Turning to FIG. 11, after blade 20 is fully opened, sliding lock 54 is biased to the left (from the perspective of FIG. 11) and interfaces against upper surface 32 of tang 22. The interface between upper surface 32 and sliding lock 54 exerts a biasing force against blade 20 from being rotated towards the closed position (e.g., blade 20 rotating counterclockwise from the perspective of FIG. 11). In this position, free end 46 of locking spring 42 is idle. To start closing blade 20 from the open position, sliding lock 54 is slid to the right from the perspective of FIG. 11 until sliding lock 54 is clear of upper surface 32 and blade is free to rotate counterclockwise, again from the perspective of FIG. 11.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A folding knife comprising:

a handle comprising a top and a bottom opposite the top;

an internal cavity defined by the handle;

a blade rotatably coupled to the handle, the blade rotating with respect to the handle into and out of the internal cavity between a retracted position and an extended position out of the bottom of the handle, the blade defining a recess;

a sliding lock slidably coupled to the handle; and a locking spring coupled to the handle, a first end of the locking spring is positioned within the recess when the blade is in the retracted position, wherein the sliding lock slides in a first direction with respect to the handle to disengage the locking spring from the recess, the locking spring comprising a displacement wall surface that is angled with respect to the first direction, wherein when the sliding lock is moved in the first direction, the interface between the sliding lock and the displacement wall surface biases the first end of the locking spring upward such that the first end of the locking spring is positioned outside of the recess.

2. The folding knife of claim 1, the locking spring comprising a second end opposite the first end and a contiguous body that extends from the first end to the second end, wherein the second end is rigidly coupled to the handle.

3. The folding knife of claim 2, wherein the first end of the locking spring interfaces against a tang of the blade.

4. The folding knife of claim 3, the second end of the locking spring defining a V-shape.

5. The folding knife of claim 1, wherein the first end of the locking spring does not interface with the blade when the blade is in the extended position.

6. The folding knife of claim 5, wherein the first end of the locking spring interfaces against a tang of the blade.

7. The folding knife of claim 1, wherein the locking spring comprises a middle portion that protrudes towards the bottom of the handle, the middle portion defining the displacement wall surface.

8. The folding knife of claim 7, the locking spring comprising a second end opposite the first end and a contiguous body that extends from the first end to the second end, wherein the second end is rigidly coupled to the handle.

9. A folding knife comprising:

a handle;

an internal cavity defined by the handle;

a blade rotatably coupled to the handle, the blade rotating with respect to the handle about an axis into and out of the internal cavity between a retracted position and an extended position;

a recess defined by the blade along an outer edge of the blade and spaced a distance from the axis, the recess defining a locking wall surface that extends radially away from the axis;

a sliding lock slidably coupled to the handle; and a locking spring coupled to the handle, a first end of the locking spring interfaces with the recess when the blade is in the retracted position, the locking spring comprising a second end opposite the first end and a contiguous body that extends from the first end to the second end, wherein a surface of the sliding lock abuts an edge of the body of the locking spring, and wherein the second end is rigidly coupled to the handle, the locking wall surface interfacing against the first end of the locking spring to bias the blade from rotating out of the handle.

10. The folding knife of claim 9, wherein the first end of the locking spring interfaces against a tang of the blade.

11. The folding knife of claim 9, wherein the first end of the locking spring does not interface with the blade when the blade is in the extended position.

12. The folding knife of claim 9, the handle comprising a top and a bottom opposite the top, the blade rotating between the retracted position and the extended position out of the bottom of the handle, wherein the locking spring comprises a middle portion that protrudes towards the bottom of the handle, and wherein the middle portion of the locking spring interfaces against the sliding lock.

13. The folding knife of claim 12, wherein the first end of the locking spring interfaces against a tang of the blade.

14. A folding knife comprising:

a handle comprising a top and a bottom opposite the top;

an internal cavity defined by the handle;

a blade rotatably coupled to the handle, the blade rotating with respect to the handle into and out of the internal cavity between a retracted position and an extended position out of the bottom of the handle, the blade defining a recess;

a locking spring coupled to the handle, a first end of the locking spring is within the recess when the blade is in the retracted position, the blade biasing the locking spring upward when the blade actuates from the extended position to the retracted position; and a sliding lock slidably coupled to the handle, wherein a surface of the sliding lock abuts an edge of the locking spring.

15. The folding knife of claim 14, the locking spring comprising a second end opposite the first end and a contiguous body that extends from the first end to the second end, wherein the second end is rigidly coupled to the handle.

16. The folding knife of claim 15, wherein the first end of the locking spring interfaces against a tang of the blade.

17. The folding knife of claim 15, the second end of the locking spring defining a V-shape.

18. The folding knife of claim 14, wherein the first end of the locking spring does not interface with the blade when the blade is in the extended position.

19. The folding knife of claim 14, wherein the locking spring comprises a middle portion that protrudes towards the bottom of the handle, and wherein the middle portion of the locking spring interfaces against the sliding lock.

20. The folding knife of claim 14, the locking spring comprising a second end opposite the first end and a contiguous body that extends from the first end to the second end, wherein the second end is rigidly coupled to the handle, the second end of the locking spring defining a V-shape.

* * * * *